United States Patent [19]
Onishi et al.

[11] Patent Number: 5,421,871
[45] Date of Patent: Jun. 6, 1995

[54] INK COMPOSITION FOR INK JET RECORDING AND PROCESS FOR PRODUCING THE SAME

[75] Inventors: Hiroyuki Onishi; Kiyohiko Takemoto; Etsuko Yoshiike; Naomi Serizawa, all of Suwa, Japan

[73] Assignee: Seiko Epson Corporation, Tokyo, Japan

[21] Appl. No.: 131,096

[22] Filed: Oct. 1, 1993

[30] Foreign Application Priority Data

Oct. 2, 1992 [JP] Japan .................. 4-0264841
Dec. 7, 1992 [JP] Japan .................. 4-326965
Mar. 19, 1993 [JP] Japan .................. 5-60151

[51] Int. Cl.$^6$ .................. C09D 11/02
[52] U.S. Cl. .................. 106/22 H; 106/22 K
[58] Field of Search .................. 106/22 H, 22 K

[56] References Cited

U.S. PATENT DOCUMENTS

| | | | |
|---|---|---|---|
| 4,505,749 | 3/1985 | Kanekiyo et al. | 106/22 R |
| 4,599,112 | 7/1986 | Yokoyama et al. | 106/22 D |
| 4,767,459 | 8/1988 | Greenwood et al. | 106/22 K |
| 4,838,938 | 6/1989 | Tomida et al. | 106/20 R |
| 4,957,553 | 9/1990 | Koike et al. | 106/20 D |
| 4,965,609 | 10/1990 | Tomida et al. | 106/22 R |
| 4,973,499 | 11/1990 | Iwata et al. | 106/22 R |
| 5,141,556 | 8/1992 | Matrick | 106/20 R |

FOREIGN PATENT DOCUMENTS

| | | |
|---|---|---|
| 280458 | 8/1988 | European Pat. Off. . |
| 56-098270 | 8/1981 | Japan . |
| 60-123571 | 7/1985 | Japan . |
| 125314 | 5/1993 | Japan . |
| 125315 | 5/1993 | Japan . |

OTHER PUBLICATIONS

Derwent Publications Ltd., London, GB AN 93 200671, Nov. 6, 1991.
Derwent Publication Ltd., London, GB AN 93-200670, Nov. 6, 1991.

*Primary Examiner*—Helene Klemanski
*Attorney, Agent, or Firm*—Ladas & Parry

[57] ABSTRACT

An ink composition for ink jet recording comprising a dye, 1 to 10% by weight of glycerin, 1 to 5% by weight of a monohydric alcohol having 4 or less carbon atoms, 0.5 to 10% by weight of 1,3-dimethyl-2-imidazolidinone and 75 to 95% by weight of water. The ink composition of the present invention can offer a good balance of properties required of the ink jet recording ink, especially quality of the print, dryability of the print, water-resistance of the print, storage stability and a property that does not attack members constituting a recording head and an ink passage.

5 Claims, No Drawings

INK COMPOSITION FOR INK JET RECORDING AND PROCESS FOR PRODUCING THE SAME

BACKGROUND OF THE INVENTION

1. Field of the Invention

The present invention relates to an ink composition for ink jet recording and a process for producing the same.

2. Background Art

Water-base ink compositions have been mainly used as an ink composition for an ink jet recording system from the viewpoint of odor, safety or the like. The ink compositions currently used is produced by dissolving various water-soluble dyes in water or a mixed solvent comprising water and a water-soluble organic solvent; and optionally adding various additives to the solution.

The following properties are required of an ink composition for ink jet recording:

(1) High-quality printing of letters and images on "plain" paper.
(2) Good dryability of a print such that the print is not smudged when the print is rubbed immediately after printing.
(3) Good filling property that provides stable jetting free from any of clogging, deviation of ink droplets from the flight path and dropouts.
(4) Water resistance of the print.
(5) Long-term storage stability of the ink.
(6) Long-term reliability in terms of a property of the ink that does not attack the members with which the ink comes into contact.

In many cases, these properties, however, have a contradictory relationship with each other. Thus, it is considerably difficult to simultaneously satisfy these properties in a balanced manner. For example, when a penetrating agent for accelerating the penetration of the ink into the recording medium is added in order to improve the dryability of the print, the ink becomes likely to blot. Furthermore, the addition of a wetting agent in an excessive amount to the ink for the purpose of preventing clogging leads to a deterioration of the dryability of the print.

For this reason, no proposal capable of satisfying all the various property requirements has hitherto been made in the art. For example, although an ink composition containing 1,3-dimethyl-2-imidazolidinone, which is disclosed in Japanese Patent Laid-Open No. 71768/1980 (Japanese Patent Publication No. 31759/1982), has an excellent capability of preventing clogging, it cannot simultaneously satisfy all the above property requirements.

In particular, so far as the present inventors know, the ink composition disclosed in Japanese Patent Laid-Open No. 71768/1980 (Japanese Patent Publication No. 31759/1982) is unsatisfactory for the above properties (1), (2), (3) and (6). In particular, with respect to the property (2), even after a print is completely dried, contact or rubbing of the print on paper with a hand or a finger causes the paper to be smudged (hereinafter referred to as "dry to the touch"). This has been pointed out from the practical viewpoint. For the property (3), in some cases, even when discharge of bubbles generated in a recording head or ink passage is attempted, the bubbles cannot be discharged. The bubbles lead to the occurrence of dropouts or disturbance of the print. In addition, 1,3-dimethyl-2-imidazolidinone in the ink composition attacks materials constituting a recording head or ink passage and causes dissolution, swelling, cracking or roughening of the surface of the materials. (This property will be hereinafter referred to as an "attack property" of 1,3-dimethyl-2-imidazolidinone or an ink composition.) For the property (6), therefore, the ink composition cannot ensure the long-term stability particularly in a head made of plastic including a photosensitive resin.

In addition, Japanese Patent Laid-Open No. 144071/1980 (Japanese Patent Publication No. 52869/1986) and Japanese Patent Laid-Open No. 163168/1981 (Japanese Patent Publication No. 33315/1982) disclose inks similar to that disclosed in the Japanese Patent Laid-Open No. 71768/1980 (Japanese Patent Publication No. 31759/1982). However, these inks cannot satisfy all the above property requirements.

SUMMARY OF THE INVENTION

Accordingly, an object of the present invention is to provide an ink composition for ink jet recording capable of satisfying properties required of an ink jet recording ink, especially the above properties (1) to (6) in a balanced manner.

Another object of the present invention is to provide an ink composition for ink jet recording capable of realizing (1) a high print quality and (2) dry to the touch on a high level.

An ink composition for ink jet recording according to the present invention comprises 0.01% by weight or more of C.I. Direct Black 168 or 154, 1 to 10% by weight of glycerin, 1 to 10% by weight of a monohydric alcohol having 4 or less carbon atoms, 0.5 to 10% by weight of 1,3-dimethyl-2-imidazolidinone and 75 to 95% by weight of water.

The present invention can provide an ink composition capable of offering a good balance or properties required of the ink jet recording ink. It is surprising that an ink composition having the above particular composition can offer a good balance of the properties.

DETAILED DESCRIPTION OF THE INVENTION

The ink composition according to the present invention comprises C.I. Direct Black 168 or 154. The C.I. Direct Black 168 or 154 has a surface activity. The surface activity can significantly improve the wettability, by the ink composition, of members constituting a recording head and an ink passage, for example, comprising glass, melts, such as nickel and stainless steel, plastics and photosensitive resins. This means that (i) there is no need of effecting a treatment for rendering the head and passage hydrophilic, (ii) the filling of the ink composition becomes easy and (iii) bubbles generated within the passage can be easily discharged. As a result, the ink composition of the present invention can stably provide a print without occurrence of clogging.

The amount of C.I. Direct Black 168 or 154 is preferably 0.01% by weight or more. When the amount is less than 0.01% by weight, the surface activity is unsatisfactory. It is still preferably 0.1 to 10% by weight, further preferably 0.2 to 5% by weight.

In the ink composition according to the present invention, although the C.I. Direct Black 168 or 154 functions also as a dye, it is also possible to further add a dye. Water-soluble dyes used in the conventional ink compositions for ink jet recording may be used as the additional dye. Examples of the additional dye include C.I.

Direct Yellow 1, 8, 11, 12, 24, 26, 27, 28, 33, 39, 44, 50, 58, 85, 86, 87, 88, 89, 98, and 157, C. I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231, C.I. Direct Blue, 1, 2, 6, 15, 22, 25, 41, 71, 76, 78, 86, 87, 90, 98, 163, 165, 199 and 202, Direct black 2, 7, 19, 22, 24, 32, 38, 51, 56, 63, 71, 74, 75, 77, 108 and 171, C.I. Acid Yellow 1, 3, 7, 11, 17, 19, 23, 25, 29, 38, 44, 79, 127, 144 and 245, C.I. Acid Red 1, 6, 8, 9, 13, 14, 18, 26, 27, 35, 37, 42, 52, 82, 85, 87, 89, 92, 97, 106, 111, 114, 115, 118, 134, 158, 186, 249, 254 and 289, C.I. Acid blue 1, 7 9, 22, 23, 25, 29, 40, 41, 43, 45, 78, 80, 82, 92, 93, 127 and 249, C.I. Acid Black 1, 2, 7, 24, 26, 29, 31, 44, 48, 50, 52 and 94, C.I. Basic Yellow 1, 2, 11 and 34, C.I. Basic Red 1, 2, 9, 12, 14, 17, 18 and 37, C.I. Basic Blue 1, 3, 5, 7, 9, 22, 24, 25, 26, 28 and 29, C.I. Basic Black 2 and 8, C.I. Food Black 1 and 2, C.I. Food Blue 2, C.I. Food Violet 2, C.I. Food Red 14, C.I. Food Yellow 4, C.I. Reactive Yellow 37, C.I. Reactive Red 23 and 180 and C.I. Reactive Black 31.

Although the amount of the dye is not particularly limited so far as printing and recording can be effected, it is generally preferably in the range of 0.01 to 10% by weight, still preferably in the range of 0.5 to 5.0% by weight.

Glycerin basically serves as a clogging preventive. The amount of glycerin is preferably in the range of 1 to 10% by weight, still preferably 2.0 to 5.0% by weight. Interestingly the particular amount of glycerin reduces the attack property of 1,3-dimethyl-2-imidazolidinone. When the amount is less than 1% by weight, clogging unfavorably occurs or the attack property of 1,3-dimethyl-2-imidazolidinone cannot be lowered. On the other hand, when it exceeds 10% bye-weight, the dryability of the print is unfavorably deteriorated.

The amount of the monohydric alcohol having 4 or less carbon atoms is preferably in the range of 1 to 10% by weight, still preferably in the range of 2 to 7% by weight. Preferred examples of the monohydric alcohol having 4 or less carbon atoms include methanol, ethanol, n-propanol, iso-propanol and butanol. Ethanol is particularly preferred from the viewpoint of safety, odor and penetration of the ink into the recording material. The alcohol volatilizes while it penetrates into the recording material. This prevents blotting and can satisfy both the quality of the print and the dryability of the print. When the amount of the alcohol is less than 1% by weight, sufficient penetrating property and evaporative power cannot be imparted to the ink composition so that there is a possibility that the dryability of the print is deteriorated. On the other hand, when the amount of the alcohol exceeds 5% by weight, it becomes difficult to ensure a good quality of the print and, further, the flash point of the ink composition is lowered, which is unfavorable also from the viewpoint of the safety.

The amount of 1,3-dimethyl-2-imidazolidinone is preferably in the range of 0.5 to 10% by weight, still preferably in the range of 1 to 5% by weight. Since 1,3-dimethyl-2-imidazolidinone has a high capability of dissolving a dye, it can increase the concentration of dye in the ink composition to enhance the record density. Since 1,3-dimethyl-2-imidazolidinone has a low viscosity, a rapid increase in the viscosity can be prevented, which contributes to an enhancement in the quality of the print and continuous and intermittent printing stability. Furthermore, 1,3-dimethyl-2-imidazolidinone has the effect of improving the water resistance of the print.

The high dye dissolution capability of 1,3-dimethyl-2-imidazolidinone is derived from its high dissolving power. The high dissolving power has often given rise to the unfavorable high attack property of the ink composition. When 1,3-dimethyl-2-imidazolidinone is present together with the above particular amount of glycerin, the attack property can be lowered to such an extent as will not give rise to a practical problem. This enables a long-term reliability of members constituting a recording head and a ink passage to be ensured. The presence of 1,3-dimethyl-2-imidazolidinone and glycerin in a ratio of 2:1 to 1:5 is particularly preferred from the viewpoint of inhibiting the attack property.

The ink composition containing 1,3-dimethyl-2-imidazolidinone generally lacks in pH stability, so that a precipitate unfavorably occurs. When 1,3-dimethyl-2-imidazolidinone is present together with the above particular amount of a monohydric alcohol having 4 or less carbon atoms, the problem can be overcome. Since 1,3-dimethyl-2-imidazolidinone has a high ability to penetrate into the recording material, the amount of the alcohol may be relatively small. Therefore, it advantageously becomes possible to provide an ink composition having a high flash point and a high safety. In addition, a combination of 1,3-dimethyl-2-imidazolidinone with an alcohol having 4 or less carbon atoms increases the viscosity of the ink composition. Therefore, the ink composition of the present invention is advantageous also in that no thickening agent is needed.

The solvent of the ink composition according to the present invention is basically water. The amount of water is 75 to 95% by weight, preferably 80 to 90% by weight. When the amount is less than 75% by weight, it becomes difficult to ensure a favorable quality of the ink. On the other hand, when it exceeds 95% by weight, clogging is unfavorably liable to occur or the dryability of the print is deteriorated. It is still preferred to use ion-exchanged water having a calcium ion or magnesium ion concentration of 5 ppm or less.

The ink composition of the present invention may further comprise an additive for further improving the properties of the ink composition. Specific examples of the additive include surfactants, viscosity modifiers, surface tension modifiers, specific resistance modifiers, pH adjustors (for example, lithium hydroxide, sodium hydroxide and potassium hydroxide), fungicides and chelating agents.

Various properties of the ink composition according to the present invention can be regulated so as to suit ink jet recording. For example, when a working temperature of the ink composition is 0° to 50° C., the viscosity is preferably 30 mPa.s or less. In order to realize a quick response (for example, 2 pages of paper having a size of A4 per min), the viscosity of the ink composition is preferably about 1.2 to 20 mPa.s. At the working temperature of 0° to 50° C., the surface tension is preferably about 35 to 60 dyne/cm and the pH is preferably about 7 to 10.

After printing is effected on a recording medium with the ink composition of the present invention, the print may be dried and fixed by suitable heat fixation means for example, a hot air, a hot roll or infrared rays.

The ink composition according to the present invention can be produced by mixing the above-mentioned components, sufficiently stirring the mixture at room temperature or with heating and optionally removing solid matter by filtration. In particular, since the ink composition of the present invention contains a relatively volatile monohydric alcohol having 4 or less carbon atoms, it is preferred that the addition of the alcohol and the stirring of the mixture be effected at a relatively low temperature, preferably 40° C. or below. A large amount of evaporation of the alcohol during the production of the ink is unfavorable because the control of the properties of the ink composition becomes so difficult that the yield is lowered.

EXAMPLES

The present invention will now be described in more detail with reference to the following Examples, though it is not limited to there Examples.

Examples 1

| | |
|---|---|
| C.I. Direct Black 168 | 0.2 wt. % |
| C.I. Direct Black 19 | 2.8 wt. % |
| Glycerin | 5.0 wt. % |
| 1,3-Dimethyl-2-imidazolidinone | 5.0 wt. % |
| Ethanol | 3.0 wt. % |
| Ion-exchanged water | 84.0 wt. % |

All the components except for ethanol in a total amount of 120 liters were placed in a 180-liter heating-stirring vessel and stirred with heating at 80° C. for 1 hr. After cooling water was circulated for about 1 hr to regulate the temperature of the ink at 40° C., ethanol was added thereto. The mixture was then stirred for about 30 min and subjected to vacuum filtration using a 0.4-μm membrane filter to provide an ink composition.

Ink compositions of Examples 2 to 8 and Comparative Examples 1 to 8 having the following respective composition were prepared in the same manner as that of Example 1.

Example 2

| | |
|---|---|
| C.I. Direct Black 168 | 0.01 wt. % |
| C.I. Direct Black 19 | 2.99 wt. % |
| Glycerin | 5.0 wt. % |
| 1,3-Dimethyl-2-imidazolidinone | 5.0 wt. % |
| Ethanol | 3.0 wt. % |
| Ion-exchanged water | 84.0 wt. % |

Example 3

| | |
|---|---|
| C.I. Direct Black 168 | 3.0 wt. % |
| Glycerin | 5.0 wt. % |
| 1,3-Dimethyl-2-imidazolidinone | 5.0 wt. % |
| Ethanol | 3.0 wt. % |
| Ion-exchanged water | 84.0 wt. % |

Example 4

| | |
|---|---|
| C.I. Direct Black 168 | 0.2 wt. % |
| C.I. Direct Black 19 | 2.80 wt. % |
| Glycerin | 10.0 wt. % |
| 1,3-Dimethyl-2-imidazolidinone | 5.0 wt. % |
| Ethanol | 3.0 wt. % |
| Ion-exchanged water | 79.0 wt. % |

Example 5

| | |
|---|---|
| C.I. Direct Black 168 | 0.2 wt. % |
| C.I. Direct Black 19 | 2.80 wt. % |
| Glycerin | 1.0 wt. % |
| 1,3-Dimethyl-2-imidazolidinone | 5.0 wt. % |
| Ethanol | 3.0 wt. % |
| Ion-exchanged water | 82.0 wt. % |

Example 6

| | |
|---|---|
| C.I. Direct Black 168 | 0.2 wt. % |
| C.I. Direct Black 19 | 2.80 wt. % |
| Glycerin | 5.0 wt. % |
| 1,3-Dimethyl-2-imidazolidinone | 0.5 wt. % |
| Ethanol | 3.0 wt. % |
| Ion-exchanged water | 88.5 wt. % |

Example 7

| | |
|---|---|
| C.I. Direct Black 168 | 0.2 wt. % |
| C.I. Direct Black 19 | 2.80 wt. % |
| Glycerin | 5.0 wt. % |
| 1,3-Dimethyl-2-imidazolidinone | 10.0 wt. % |
| Ethanol | 3.0 wt. % |
| Ion-exchanged water | 79.0 wt. % |

Example 8

| | |
|---|---|
| C.I. Direct Black 168 | 0.2 wt. % |
| C.I. Direct Black 19 | 2.80 wt. % |
| Glycerin | 5.0 wt. % |
| 1,3-Dimethyl-2-imidazolidinone | 5.0 wt. % |
| Ethanol | 1.0 wt. % |
| Ion-exchanged water | 86.0 wt. % |

Example 9

| | |
|---|---|
| C.I. Direct Black 168 | 0.2 wt. % |
| C.I. Direct Black 19 | 2.80 wt. % |
| Glycerin | 5.0 wt. % |
| 1,3-Dimethyl-2-imidazolidinone | 5.0 wt. % |
| Ethanol | 5.0 wt. % |
| Ion-exchanged water | 82.0 wt. % |

Example 10

| | |
|---|---|
| C.I. Direct Black 154 | 0.2 wt. % |
| C.I. Direct Black 19 | 2.8 wt. % |
| Glycerin | 5.0 wt. % |
| 1,3-Dimethyl-2-imidazolidinone | 5.0 wt. % |
| Ethanol | 3.0 wt. % |
| Ion-exchanged water | 84.0 wt. % |

Example 11

| | |
|---|---|
| C.I. Direct Black 168 | 0.2 wt. % |
| C.I. Direct Black 19 | 2.8 wt. % |
| Glycerin | 4.0 wt. % |
| 1,3-Dimethyl-2-imidazolidinone | 2.0 wt. % |
| Ethanol | 4.0 wt. % |
| Ion-exchanged water | 87.0 wt. % |

Comparative Example 1

| | |
|---|---|
| C.I. Direct Black 19 | 3.0 wt. % |
| Glycerin | 5.0 wt. % |
| 1,3-Dimethyl-2-imidazolidinone | 5.0 wt. % |
| Ethanol | 3.0 wt. % |
| Ion-exchanged water | 84.0 wt. % |

Comparative Example 2

| | |
|---|---|
| C.I. Direct Black 168 | 0.2 wt. % |
| C.I. Direct Black 19 | 2.80 wt. % |
| Glycerin | 15.0 wt. % |
| 1,3-Dimethyl-2-imidazolidinone | 5.0 wt. % |
| Ethanol | 3.0 wt. % |
| Ion-exchanged water | 74.0 wt. % |

Comparative Example 3

| | |
|---|---|
| C.I. Direct Black 168 | 0.2 wt. % |
| C.I. Direct Black 19 | 2.80 wt. % |
| 1,3-Dimethyl-2-imidazolidinone | 5.0 wt. % |
| Ethanol | 3.0 wt. % |
| Ion-exchanged water | 89.0 wt. % |

Comparative Example 4

| | |
|---|---|
| C.I. Direct Black 168 | 0.2 wt. % |
| C.I. Direct Black 19 | 2.80 wt. % |
| Glycerin | 5.0 wt. % |
| Ethanol | 3.0 wt. % |
| Ion-exchanged water | 89.0 wt. % |

Comparative Example 5

| | |
|---|---|
| C.I. Direct Black 168 | 0.2 wt. % |
| C.I. Direct Black 19 | 2.80 wt. % |
| Glycerin | 5.0 wt. % |
| 1,3-Dimethyl-2-imidazolidinone | 15.0 wt. % |
| Ethanol | 3.0 wt. % |
| Ion-exchanged water | 74.0 wt. % |

Comparative Example 6

| | |
|---|---|
| C.I. Direct Black 168 | 0.2 wt. % |
| C.I. Direct Black 19 | 2.80 wt. % |
| Glycerin | 5.0 wt. % |
| 1,3-Dimethyl-2-imidazolidinone | 5.0 wt. % |
| Ion-exchanged water | 87.0 wt. % |

Comparative Example 7

| | |
|---|---|
| C.I. Direct Black 168 | 0.2 wt. % |
| C.I. Direct Black 19 | 2.80 wt. % |
| Glycerin | 5.0 wt. % |
| 1,3-Dimethyl-2-imidazolidinone | 5.0 wt. % |
| Ethanol | 6.0 wt. % |
| Ion-exchanged water | 81.0 wt. % |

Comparative Example 8

An ink composition described in Example 1 of Japanese Patent Laid-Open No. 71768/1980 (Japanese Patent Publication No. 31759/1982).

| | |
|---|---|
| 1,3-Dimethyl-2-imidazolidinone | 60.0 wt. % |
| Sumilite Black G Conc | 4.0 Wt. % |
| Ion-exchanged water | 36.0 wt. % |

Comparative 9

A recording solution was prepared in the same manner as that of Example 1, except that ethanol was added at a temperature above 40° C.

Ink compositions of Examples 1 to 9 and Comparative Examples 1 to 9 were tested using an ink jet printer HG-5130 (manufactured by Seiko Epson Corporation) on (1) quality of the print, (2) dryability of the print, (3) printing stability, (4) water resistance of the print, (5) storage stability of the ink composition and (6) long-term reliability of the ink composition in terms of its attack property on members constituting a recording head and a ink passage, a change in the properties of the ink composition and occurrence of a precipitate. Evaluation was effected based on the following criteria. The results of the evaluation are as given in Table 1.

The printing quality was examined using 10 kinds of each of paper made in Europe, America and Japan, i.e., 30 kinds in total of paper.

(1) Evaluation of Quality of Print

The print was observed under a microscope (×100 and ×400) and with the naked eye. The percentage of the papers on which the print had a sharp edge without blotting along a fiber of the paper was calculated. The criteria of the evaluation were as follows.

⊙: 80% or more
○: 60 to 79%
Δ: 40 to 59%
X: 39% or less (2) Evaluation of Dryability of Print (2-1) 10 sec after the printing, the print was rubbed with the edge of paper. The percentage of the papers that gave rise to no smudging 10 sec after the initiation of the rubbing was calculated. The criteria of the evaluation were as follows.

⊙: 80% or more
○: 60 to 79%
Δ: 40 to 59%
X: 39% or less (2-2) After drying of the print, a finger was pressed down against the print for 10 min and then rubbed against the print. The percentage of the papers that gave rise to no stain of the finger or paper was calculated. The criteria of the evaluation were as follows.

⊙: 80% or more
○: 60 to 79%
Δ: 40 to 59%
X: 39% or less (3) Evaluation of Printing Stability (3-1) Continuous printing was effected to determine the period of time for which the printing could be stably effected. The criteria of the evaluation were as follows.

⊙: 24 hr or more
○: 10 to less than 24 hr
X: less than 10 hr (3-2) Intermittent printing was effected at intervals of 30 sec to determine the period of time for which the intermittent printing could be stably effected. The criteria of the evaluation were as follows.

⊚: 10 hr or more
○: 60 to less than 10 hr
X: less than 1 hr (3-3) The printer with the ink composition was allowed to stand in a constant temperature bath at 70° C. for one month. The number of times of a cleaning operation necessary for satisfactory printing to be completely resumed was counted. The criteria of the evaluation were as follows.

⊚: Satisfactory printing could be completely resumed by repeating cleaning less than 3 times.
○: 60 Satisfactory printing could be completely resumed by repeating cleaning 3 to 5 times.
△: Satisfactory printing could be completely resumed by repeating cleaning 5 to 10 times.
X: Satisfactory printing could not be completely resumed or could not be resumed at all even by repeating cleaning 10 or more times.

(4) Evaluation of Water Resistance

The print was immersed in water for 10 sec. The percentage of the papers that gave rise to no stain was calculated. The criteria of the evaluation were as follows.

⊚: 80% or more
○: 60 to 79%
△: 40 to 59%
X: 39% or less (5) Storage Stability of Ink 100 cc of the ink composition was sealed into an aluminum pack and stored in a constant temperature bath at 70° C. for 1 month. The ink composition was investigated to determine whether or not properties (pH, viscosity, surface tension and electric conductivity) of the ink composition were changed and whether or not a precipitate was occurred. The criteria of the evaluation were as follows.

○: Neither a change in the properties of the ink nor occurrence of a precipitate observed.
△: A change in the properties of the ink or the occurrence of a precipitate observed.
X: Both a change in the properties of the ink and occurrence of a precipitate observed.

(6) Attack property and Occurrence of Precipitate

A member constituting a recording head and a member constituting an ink passage were brought into contact with the ink composition and stored in a constant temperature bath at 70° C. for 1 month. The members were investigated to determine whether or not the ink composition attacked the members and caused dissolution, swelling, cracking or roughening of the members. In addition, the ink composition was investigated to determined whether or not properties of the ink composition were changed and whether or not a precipitate was occurred. The criteria of the evaluation were as follows.

○: None of a sign on the members of being attacked by the ink composition, change in the properties of the ink composition and occurrence of a precipitate was observed.
△: At least one of a sign of being attacked by the ink composition, change in the properties or occurrence of a precipitate was observed.
X: All the sign attacked by the ink composition, change in the properties and occurrence of a precipitate were observed.

TABLE 1

| | Evaluation Tests | | | | | | | | |
|---|---|---|---|---|---|---|---|---|---|
| | (1) | (2-1) | (2-2) | (3-1) | (3-2) | (3-3) | (4) | (5) | (6) |
| Example 1 | ⊚ | ⊚ | ⊚ | ⊚ | ⊚ | ⊚ | ⊚ | ○ | ○ |
| Example 2 | ⊚ | ⊚ | ⊚ | ⊚ | ⊚ | ○ | ⊚ | ○ | ○ |
| Example 3 | ⊚ | ⊚ | ⊚ | ⊚ | ⊚ | ⊚ | ⊚ | ○ | ○ |
| Example 4 | ⊚ | ○ | ⊚ | ⊚ | ⊚ | ⊚ | ⊚ | ○ | ○ |
| Example 5 | ⊚ | ⊚ | ⊚ | ⊚ | ⊚ | ⊚ | ⊚ | ○ | ○ |
| Example 6 | ⊚ | ⊚ | ⊚ | ⊚ | ⊚ | ⊚ | ○ | ○ | ○ |
| Example 7 | ⊚ | ⊚ | ⊚ | ⊚ | ⊚ | ⊚ | ⊚ | ○ | ○ |
| Example 8 | ⊚ | ○ | ⊚ | ⊚ | ⊚ | ⊚ | ⊚ | ○ | ○ |
| Example 9 | ⊚ | ⊚ | ⊚ | ⊚ | ⊚ | ⊚ | ⊚ | ○ | ○ |
| Example 10 | ⊚ | ⊚ | ⊚ | ⊚ | ⊚ | ⊚ | ⊚ | ○ | ○ |
| Example 11 | ⊚ | ⊚ | ⊚ | ⊚ | ⊚ | ⊚ | ⊚ | ○ | ○ |
| Comparative Example 1 | ⊚ | ⊚ | ⊚ | △ | ⊚ | ⊚ | ⊚ | ○ | ○ |
| Comparative Example 2 | ○ | X | ○ | ⊚ | ⊚ | ⊚ | ⊚ | ○ | ○ |
| Comparative Example 3 | ⊚ | ⊚ | ⊚ | ○ | ○ | △ | ○ | ○ | X |
| Comparative Example 4 | ○ | ○ | X | ○ | X | △ | X | ○ | ○ |
| Comparative Example 5 | ○ | ⊚ | ⊚ | ⊚ | ⊚ | ⊚ | ⊚ | △ | X |
| Comparative Example 6 | ○ | X | ○ | X | ○ | X | ○ | △ | ○ |
| Comparative Example 7 | X | ⊚ | ⊚ | ⊚ | ⊚ | ⊚ | ⊚ | ○ | ○ |
| Comparative Example 8 | X | △ | ⊚ | ○ | ⊚ | X | ○ | X | X |
| Comparative Example 9 | ○ | X | ○ | X | ○ | X | ○ | △ | ○ |

Properties (viscosity and surface tension) and ethanol content of the ink compositions of Example 1 and Comparative Example 9 were measured. The results are given in Table 2.

The viscosity and surface tension were measured by using a B type viscosity (manufactured by Tokyo Keiki Co., Ltd.) and a tension meter CBVP-A3 (Kyowa Interface Science Co., Ltd.), respectively, and the ethanol content was determined by quantitative analysis using a gas chromatograph (manufactured by Shimadzu Seisakusho Ltd.).

TABLE 2

| | Ex. 1 | Comp. Ex. 9 |
|---|---|---|
| Viscosity (mPa.s) | 2.0 | 1.70 |
| Surface tension (mN/m) | 55.0 | 61.0 |
| Ethanol content (wt. %) | 3.0 | 0.5 |

What is claimed is:

1. An ink composition for ink jet recording comprising 0.01% by weight or more of C.I. Direct Black 168 or 154, 1 to 10% by weight of glycerin, 1 to 10% by weight of a monohydric alcohol having 4 or less carbon atoms, 0.5 to 10% by weight of 1,3-dimethyl-2-imidazolidinone and 75 to 95% by weight of water.

2. An ink composition according to claim 1, which further comprises a dye other than C.I. Direct Black 168 and 154.

3. An ink composition according to claim 1, wherein the monohydric alcohol having 4 or less carbon atoms is ethanol.

4. An ink composition according to claim 1, wherein the ratio of 1,3-dimethyl-2-imidazolidinone to glycerin is in the range of from 2:1 to 1:5.

5. A process for producing an ink composition according to claim 1, comprising adding a monohydric alcohol having 4 or less carbon atoms at a temperature of 40° C. or below to a mixture comprising a dye, glycerin, 1,3-dimethyl-2-imidazolidinone and water.

* * * * *